US012801411B2

(12) United States Patent
Sanapo et al.

(10) Patent No.: US 12,801,411 B2
(45) Date of Patent: Nov. 17, 2026

(54) ARCHITECTURE TO EMPLOY MACHINE-LEARNING MODEL

(71) Applicant: Amadeus S.A.S., Biot (FR)

(72) Inventors: Davide Sanapo, Mougins (FR); Generoso Pagano, Antibes (FR); Michael Defoin-Platel, Les Adrets de l'Esterel (FR)

(73) Assignee: Amadeus S.A.S., Biot (FR)

( * ) Notice: Subject to any disclaimer, the term of this patent is extended or adjusted under 35 U.S.C. 154(b) by 435 days.

(21) Appl. No.: 18/564,713

(22) PCT Filed: May 20, 2022

(86) PCT No.: PCT/EP2022/063804
§ 371 (c)(1),
(2) Date: Nov. 28, 2023

(87) PCT Pub. No.: WO2022/253602
PCT Pub. Date: Dec. 8, 2022

(65) Prior Publication Data

US 2024/0256313 A1 Aug. 1, 2024

(30) Foreign Application Priority Data

Jun. 2, 2021 (EP) .................................... 21305738

(51) Int. Cl.
*G06F 9/455* (2018.01)
*G06F 8/30* (2018.01)

(52) U.S. Cl.
CPC ............ *G06F 9/45504* (2013.01); *G06F 8/31* (2013.01)

(58) Field of Classification Search
CPC ............................... G06F 9/45504; G06F 8/31
See application file for complete search history.

(56) References Cited

U.S. PATENT DOCUMENTS

2015/0379423 A1 12/2015 Dirac et al.
2019/0156244 A1 5/2019 Faulhaber, Jr. et al.
2020/0327392 A1 * 10/2020 Bleiweiss ............ G06N 3/0464

(Continued)

OTHER PUBLICATIONS

Anonymous: "Serialization—Wikipedia", Nov. 25, 2019 (Nov. 25, 2019), XP055792124, Retrieved from the Internet: URL:https://en.wikipedia.org/w/index.php?title=Serialization&oldid=927895895; 12 pages.

(Continued)

*Primary Examiner* — Diem K Cao
(74) *Attorney, Agent, or Firm* — Thompson Hine LLP

(57) ABSTRACT

A computer-implemented execution platform for executing a machine-learning model programmed and trained on a development platform utilizing a first programming language, a corresponding method and a corresponding computer program product are provided. The execution platform is implemented based on a second programming language and comprises a service container and a model server container. The service container is arranged to receive interrogation requests to interrogate the machine-learning model and to return interrogation responses of the machine-learning model. The model server container hosts an encapsulated instance of the machine-learning model adapted to run on the execution platform utilizing data structures and operations of the first programming language.

17 Claims, 6 Drawing Sheets

(56) References Cited

U.S. PATENT DOCUMENTS

2020/0394566 A1 12/2020 Martin et al.
2021/0271529 A1* 9/2021 Sierra ................... G06F 16/383

OTHER PUBLICATIONS

Anonymous: "Microservices—Wikipedia", Feb. 2, 2018 (Feb. 2, 2018), XP055570739, Retrieved from the Internet: URL:https://en.wikipedia.org/w/index.php?t itle=Microservices&oldid=823579390 [retrieved on Mar. 18, 2019]; 8 pages.
Anonymous: "Representational state transfer", Wikipedia, the free encyclopedia, Oct. 25, 2012 (Oct. 25, 2012), XP055282687, Retrieved from the Internet: URL: https://en.wikipedia.org/w/index.php?title=Representational_state_transfer&oldid=519823558 [retrieved on Jun. 22, 2016]; 10 pages.
Anonymous: "Remote procedure call—Wikipedia" , Jun. 12, 2013 (Jun. 12, 2013), XP055326982, Retrieved from the Internet: URL: https://en.wikipedia.org/w/index.php?title=Remote_procedure_call&oldid=559644688 [retrieved on Dec. 7, 2016]; 4 pages.
European Patent Office, International Search Report and Written Opinion issued in International patent application serial No. PCT/EP2022/063804 on Sep. 21, 2022, 17 pages.

* cited by examiner

ARCHITECTURE TO EMPLOY MACHINE-LEARNING MODEL

FIELD

The present disclosure generally relates to machine-learning models. More specifically, it relates to an architecture which is arranged to employ a machine-learning model in a production phase after a training phase.

BACKGROUND

A general challenge in modern information technology environments is heterogeneity of platforms and tools. Generally, various platforms in terms of programming languages, databases, interfaces, etc. have been developed in the past and are utilized in production systems for different purposes. While specific individual platforms usually address a particular technical requirement or convey a particular technical advantage, interoperability between different platforms is not always given. The creation of interfaces between different platforms or rendering platforms eligible for communicating via industry standards, e.g. by way of migration, is often costly, cumbersome and error-prone.

Hence, there is a general demand for systems which address or remedy these issues.

SUMMARY

In this context, a computer-implemented execution platform for executing a machine-learning model programmed and trained on a development platform utilizing a first programming language, a corresponding method and a corresponding computer program product are presented as defined by the independent claims.

The execution platform is implemented based on a second programming language and comprises a number of components including a service container and a model server container. The service container is arranged to receive interrogation requests to interrogate the machine-learning model and to return interrogation responses of the machine-learning model.

The model server container hosts an encapsulated instance of the machine-learning model adapted to run on the execution platform utilizing data structures and operations of the first programming language. A communication interface communicatively couples the service container and the model server container. The service container is further arranged to convert the interrogation requests to calls of the model server container and re-convert call responses from the model server container to the interrogation responses. The model server container is further arranged to receive the calls via the communication interface, to determine outputs of the machine-learning model and to return the call responses with the output via the communication interface.

Furthermore, a computer-implemented method is presented which corresponds to the aforementioned functionalities of the execution platform.

Moreover, a computer program is presented, the execution of which causes a computer to perform the aforementioned functionality of the execution platform.

Further refinements are set forth by the dependent claims.

Further aspects are apparent from the subsequent description.

BRIEF DESCRIPTION OF THE FIGURES

Aspects and examples of the present disclosure are described with reference to the following figures, in which.

DETAILED DESCRIPTION

The present disclosure relates to the employment of a machine-learning model on an execution platform in order to inquire the machine-learning model in an efficient and performant manner.

Traditionally, development, programming and training of machine-learning models occurs on computerized platforms which are specifically arranged for these purposes. For example, existing Python®-based platforms facilitate machine-learning model programming, as there are various Python® libraries such as Scikit-learn, Keras, PyTorch and TensorFlow which provide underlying functions supporting e.g. deep neural networks, supervised and un-supervised learning such as multidimensional matrix operations. Hence, such platforms e.g. employing the Python® programming language are currently predominantly used for creating and training machine-learning models.

On the other hand, these programming and training platforms are not necessarily par-ticularly efficient and performant to actually employ and utilize the machine-learning models in production systems. In this respect, other platforms and programming languages offer functionalities having technical efficiency, performance and universality advantages to interrogate an established and trained machine-learning model. For example, Java®-based platforms provide and support service interfaces which are universally supported by service requesting entities, clients and applications.

Employment of a machine-learning model after the training phase thus encompasses difficulties. Setting up the machine-learning model in a production platform offering an efficient, performant and universal service environment regularly requires a transformation or migration of the machine-learning model from the generation and training environment to the production environment. Alternatively, if this is to be avoided, the machine-learning model would be employed in the less efficient and performant generation environment. Both options bear technical disadvantages and are therefore dissatisfactory.

Figure 1:
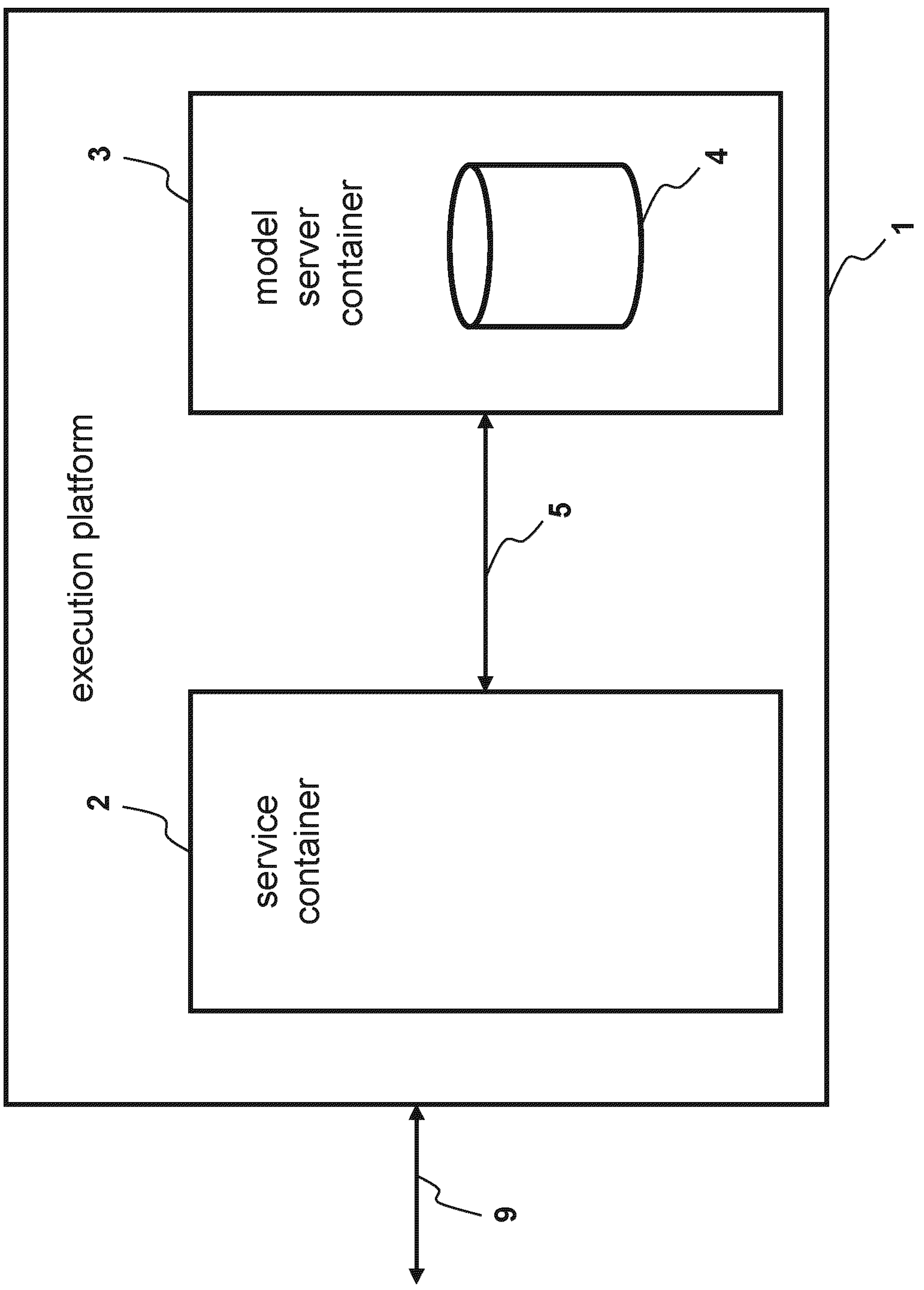
FIG. 1 schematically shows an execution platform as described herein.

The present disclosure is directed to address these issues and provides a technical solution seeking to reduce migration efforts, while obtaining the aforementioned technical benefits of a production environment. According to one aspect, the solution is conveyed by an architecture with an execution platform as schematically visualized by FIG. 1. The architecture includes an execution platform 1 with two containers, a service container 2 and a model server container 3. Generally, the execution platform 1 is able to host and execute a machine-learning model which has previously been programmed and trained on a development platform utilizing a first programming language. The first programming language may be a language that is generally suited for machine-learning development and training purposes such as Python®, while the execution platform itself is implemented based on a second programming language which may be an object-oriented language with technical advantages in terms of performance and (standardized) service interfaces such as Java®. The term container is generally used herein to denote a relatively isolated entity bundling or packaging a group of functionalities provided by a containerization software, potentially also associated to defined communication and hardware resources. Non-limiting examples of containers are virtual machines, Linux Containers such as container within RedHat OpenShift Pods, virtual private servers, Solaris® containers (Zones), virtual kernels or virtual environments. Hence, in embodiments, one or both of the service container 2 and the model server container 3 are implemented as a container of a containerization software platform such as OpenShift Pods. In a specific exemplary implementation, the execution platform 1 is arranged as an OpenShift Pod with both, the service container 2 and the model server container 3, being implemented as an OpenShift container with the OpenShift Pod.

The service container 2 is arranged to receive interrogation requests to interrogate the machine-learning model and to return interrogation responses of the machine-learning model. To facilitate communication of the service container 2 to receive interrogation requests and return interrogation responses, the execution platform is equipped with at least one communication interface 9. The communication interface 9 may utilize any sorts of communication technology such as wired and/or wireless communication and/or mobile communication networks, one or more local area network, and/or one or more wide area networks such as the Internet, as well as any sorts of communication protocols such as WiFi, Ethernet, Internet Protocol (IP), Transport Control Protocol (TCP), Hypertext Transfer Protocol (HTTP) and others.

The model server container 3 hosts an encapsulated instance of the machine-learning model. The machine learning model is adapted to run on the execution platform 1 utilizing data structures and operations of the first programming language. The service container 2 is further arranged to convert the interrogation requests to calls of the model server container and re-convert call responses from the model server container to the interrogation responses. The model server container 3 is further arranged to receive the calls via the communication interface, to determine outputs of the machine-learning model and to return the call responses with the output via the communication interface 8.

Figure 2:
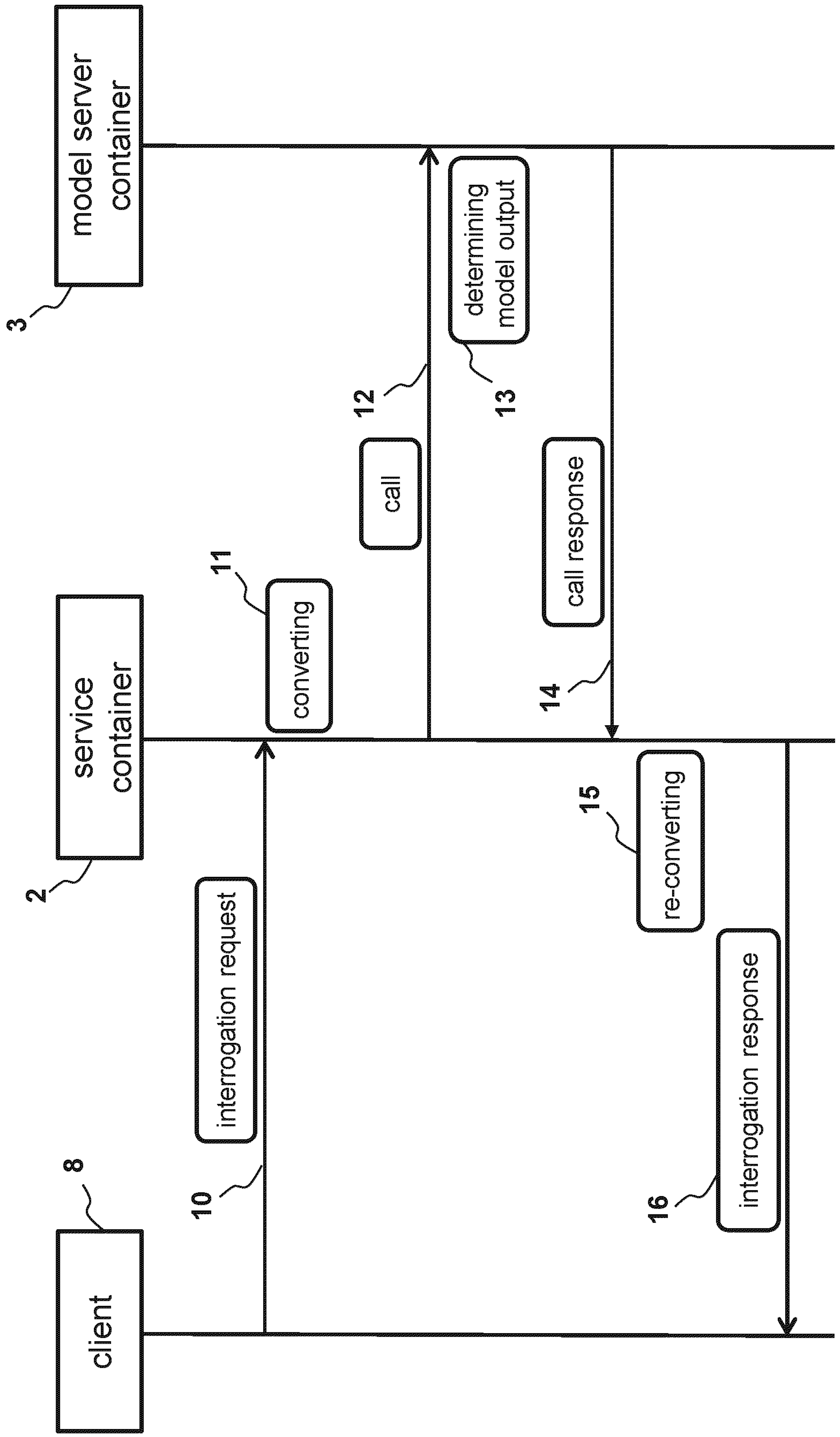
FIG. 2 is a message sequence chart for interrogating a machine-learning model executed on the execution platform.

A message sequence chart visualizing this procedure is given by FIG. 2. An interrogation request 10 is issued by a client 8. The client 8 may be a machine such as a personal computer, laptop, tablet computer, mobile phone and/or a software client such as an application or server. The interrogation request 10 is received by the service container 2 of the execution platform 1. The interrogation request 10 indicates one or more input parameters which are expected by the machine-learning model 4 to generate an output such as a prediction.

In response to receiving the interrogation request 10, the service container 2 converts 11 the interrogation request to a call 12 to the model server container in order to inquire the machine-learning model. The call 12 includes the one or more input parameters to inquire the machine-learning model 4, typically in a different representation (e.g. data format) than in the interrogation request 10, such as a data format utilized by the machine-learning model 4 according to the first programming language. The service container sends the call 12 to the model server container 3. The model server container 3 receives the call and determines 13 a corresponding response of the machine-learning model 4 to the interrogation request, i.e. the model output.

The model server container 3 then prepares a call response 14 with the model output and sends the call response 14 back to the service container 2. The service container 2 receives the call response 14 and reconverts 15 the call response 14 to an interrogation response 16, in line with the communication specifications (e.g. protocol) on the communication interface 9. The service container 2 then returns the interrogation response 16 to the client 8 over the communication interface 9. The client 8 receives the interrogation response 16, thereby concluding the procedure of FIG. 2.

Generally, by way of this architecture, the service container 2 constitutes an efficient and performance service interface to any client 8 interrogating the machine-learning model. In other words, the execution platform 1 with the service container provides a model-interrogation service to any client 8. Technically, the interface between the client 8 and the service container 2 can be of any nature, and in particular in accordance with standards and specification natively supported by the first programming language such as Java®. In some embodiments, a streaming service interface may be utilized, e.g. by way of Kafka messages. In addition, or alternatively, the model service container 2 may be arranged to provide a microservice. Non-limiting examples of the microservice include a REST (Representational State Transfer) microservice utilizing HTTP, HTML (Hypertext Markup Language) and/or XML (Extensible Markup Language) methodologies, as well as a streaming microservice such as Kafka. Accordingly, in such embodiments, the interrogation requests 10, and also the interrogation responses 16, are at least one of Representational State Transfer, REST, protocol messages and streaming process messages. The service container 2 may also be arranged to support multiple microservices at the same time, e.g. an HTTP microservice and a Kafka microservice.

On the other hand, the machine-learning model 4 is encapsulated in the model server container 3 which remains to be based on the second programming language of the creation and training platform. No migration or change of data format is required for the machine-learning model 4 to be deployed. This arrangement also facilitates automation of the deploy-ment of the machine-learning model at the production environment. The service container 2 can be considered as a standard component, the setup and configuration of which is independent from the particularities of the machine-learning model. Hence, the service container 2 can be generated fully automatically. Manual adaption can thus be reduced to employment of the machine-learning model 4 within the model server container 3 and the execution-platform-internal interfaces between the service container 2 and the model service container 3. Again, these benefits are obtainable irrespective of the content, purpose or quality of the machine-learning model.

Figure 3:
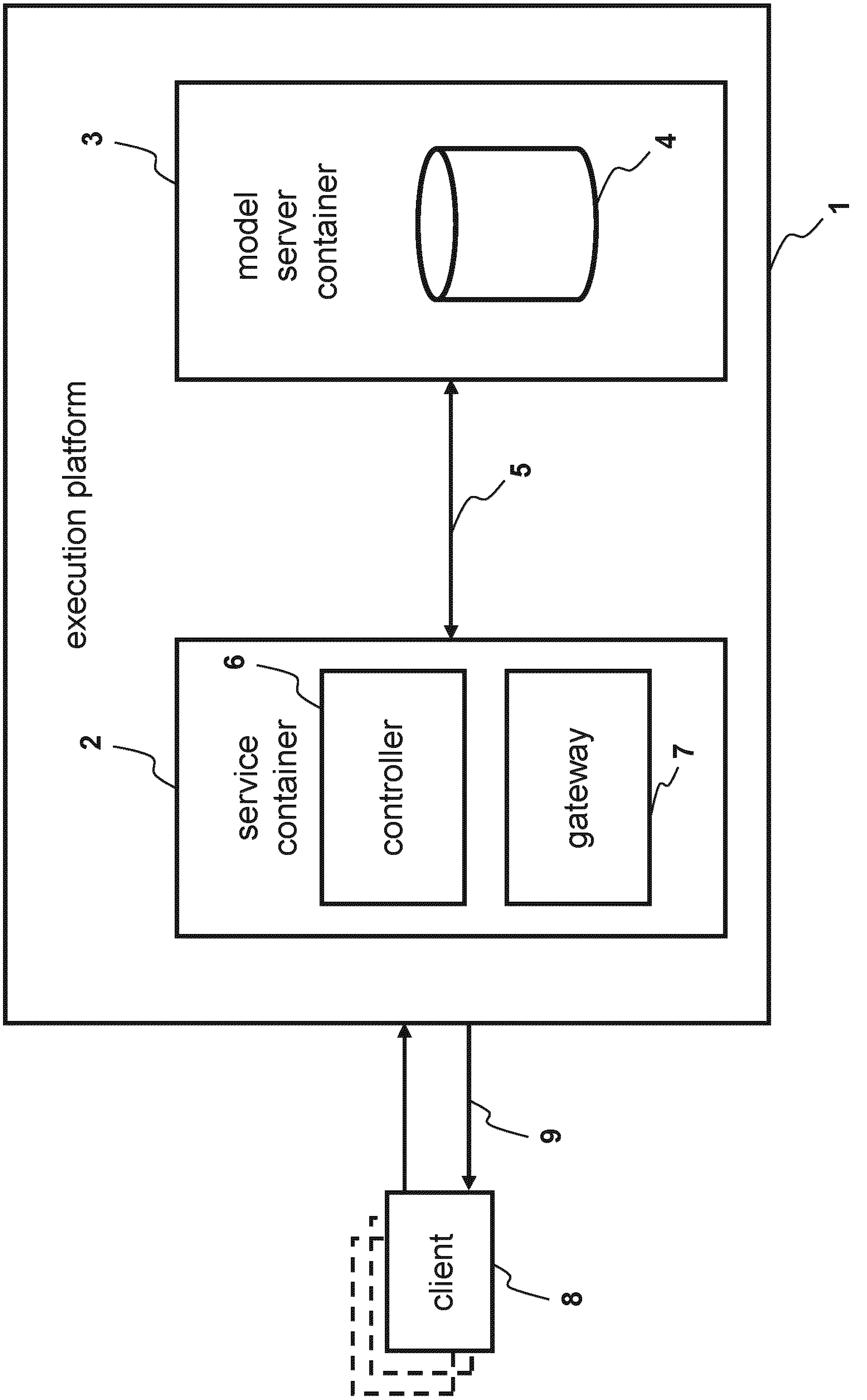
FIG. 3 illustrates a more detailed example of the execution platform.

A more specific example of an execution platform 1 as described herein is given with reference to FIG. 3. The example of FIG. 3 is based on the more general representation of FIG. 1. One or more clients 8 are communicatively coupled with the execution platform 1 over the bidirectional communication interface 9. As in FIG. 1, the execution platform includes the service container 2 and the model server container 3.

The service container 2 includes two components which implement the aforementioned functionalities of the service container 2, namely a controller 6 and a gateway 7. The controller 6 is arranged to receive interrogation requests 10, to return interrogation responses 16 as well as to effect the conversions 11 and re-conversions 15 as shown by FIG. 2. In embodiments, the controller 6 is an Application Programming Interface (API) controller which implements a microservice that is offered towards the one or more clients 8. The gateway 7 is arranged to communicate with the model server container, i.e. implements the calls 21 and receives the call responses 14 as shown by FIG. 2. In embodiments, the gateway 7 is based on a remote procedure call (RPC) framework, the model server container 3 employs a remote procedure call server and the calls 12 to the model server container 3 are remote procedure calls.

Figure 4:
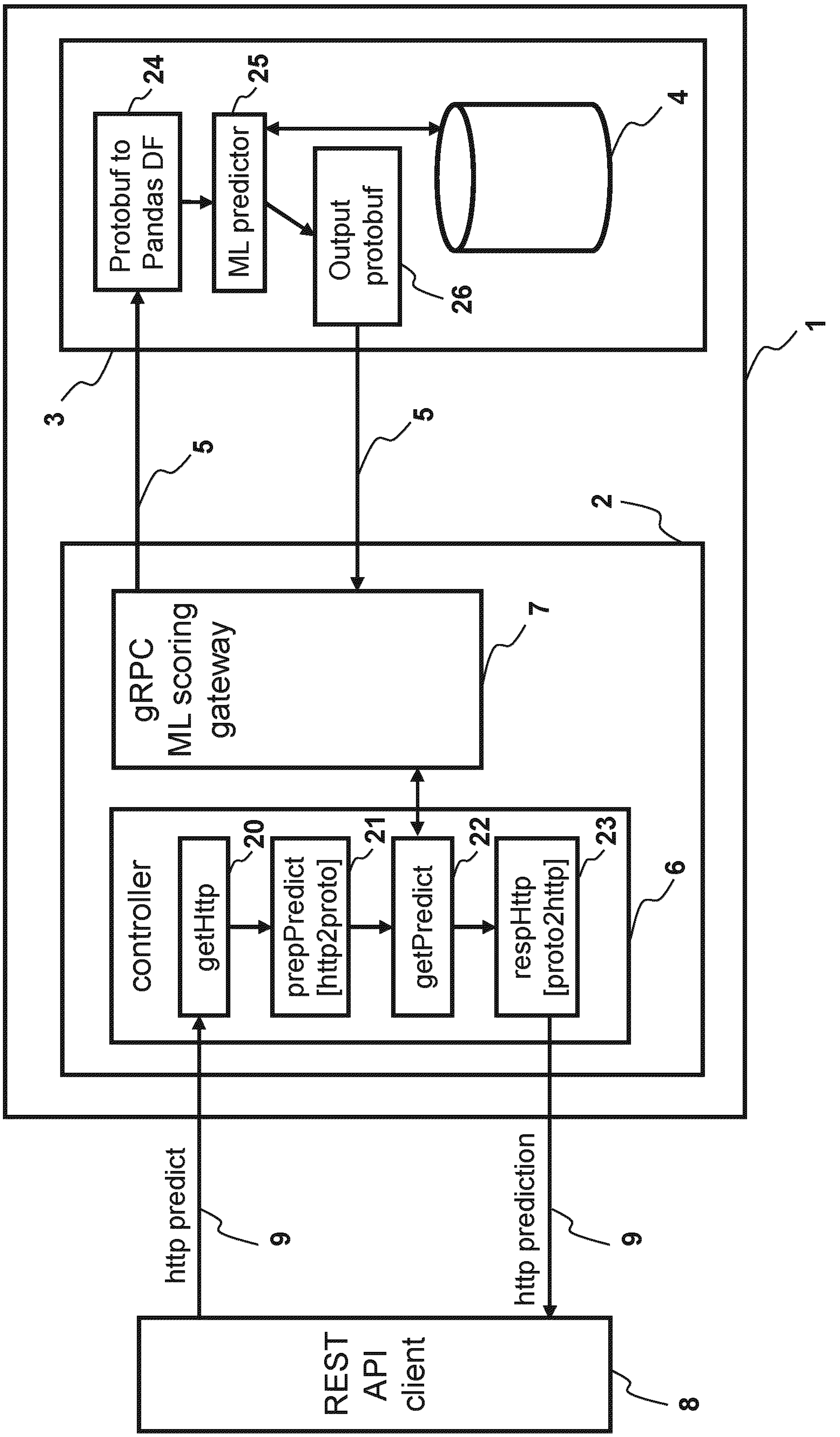
FIGS. 4 and 5 visualize more specific examples of the execution platform.
Figure 5:
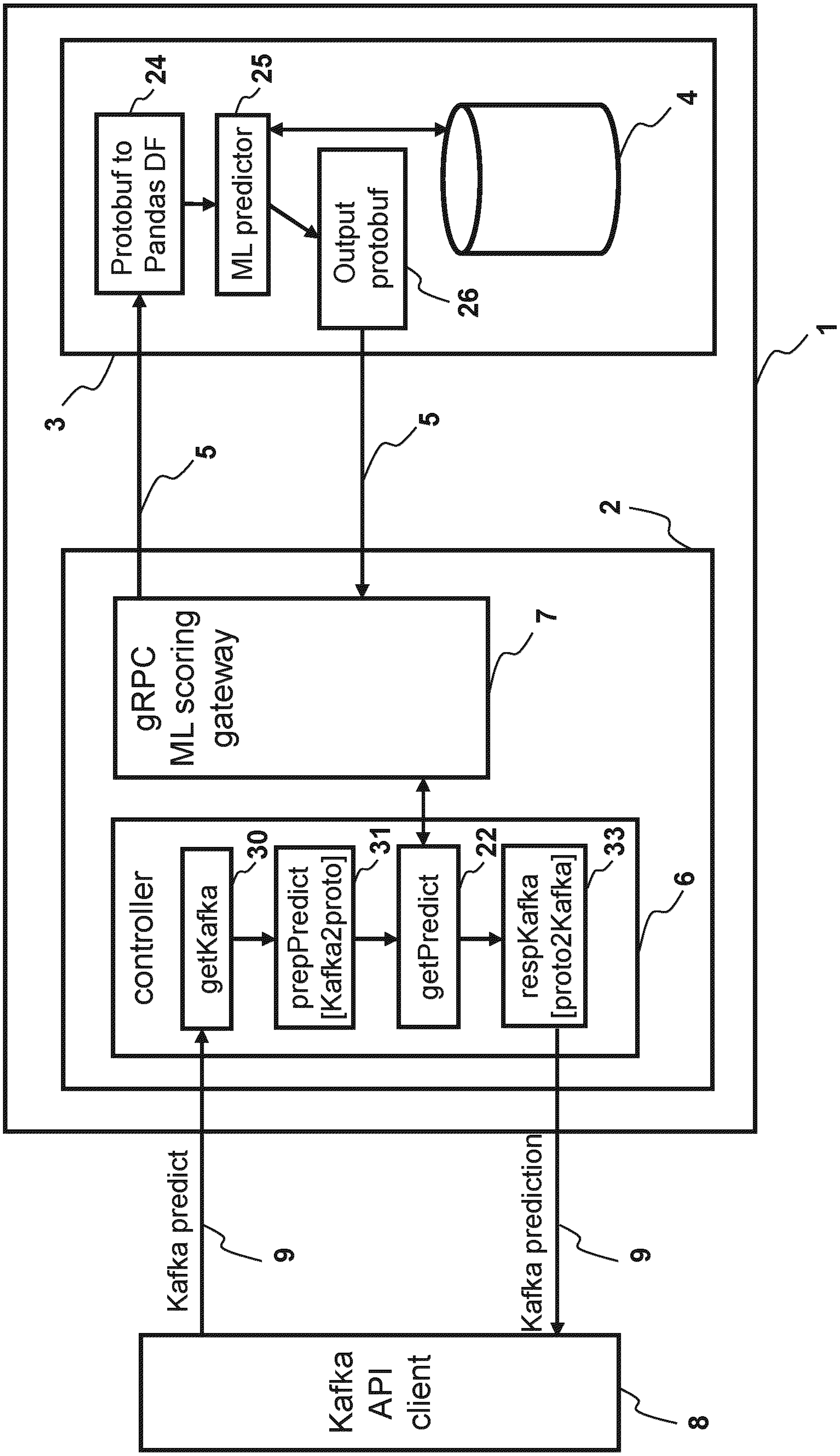

FIGS. 4 and 5 visualize two more specific examples of the execution platform 1. In the example of FIG. 4, the execution platform 1 offers a REST microservice to one or more clients 8, while the example of FIG. 5 relates to a streaming microservice. In both examples, the controller 6 of the service container 2 includes a number of sub-components, such as a get module 20, 30 which is arranged to receive interrogation requests 10 from the client 8, a prepare prediction module 21, 31 which is arranged to implement the conversion 11 of the interrogation requests 10, a get prediction module 22 which is arranged to forward the converted interrogation requests to the gateway 7 and receives the responses from the gateway 7, and response module 23, 33 which is arranged to implement the re-conversion 15 and to return the interrogation responses 16.

Furthermore, both examples of FIGS. 4 and 5 utilize gRPC as a protocol to call the model server container. gRPC is an open source RPC system which uses HTTP for transport and ProtoBuf (Protocol Buffers) as the interface description language. Further, gRPC provides features such as authentication, bidirectional streaming and flow control, blocking or nonblocking bindings, and cancellation and timeouts. The examples of FIGS. 4 and 5 utilize gRPC to cross-connect and to communicatively couple the service container 2 and the model server container 3, although both containers utilize different programming languages, as explained above.

To this end, incoming interrogation requests 10 are converted by the prepare prediction modules 21, 31 by way of ProtoBuf serializations that constitute the input for the gRPC calls of the gateway 7, while responses from the gateway 7 are deserialized back to the data representation and structures employed at the communication interface 9. In other words, in the examples of FIGS. 4 and 5, converting 11 the interrogation requests comprises a serialization and re-converting the call responses comprises a de-serialization.

Moreover, in both examples of FIGS. 4 and 5, the model server container 3 includes a number of components, such as a conversion component 24 which is arranged to convert the ProtoBuf-based remote procedure calls to a representation and format that is utilized and expected by the machine-learning model 4, e.g. Pandas data frames which are predominantly employed on Python-based platforms such as machine-learning development and training platforms. The model server container 3 further includes a machine-learning model predictor 25 which is arranged to inquire the machine-learning model 4 in order to obtain the output (prediction) of the machine-learning model 4. Furthermore, the model server container 3 includes an output component 26 which is arranged to receive the output of the machine-learning model 4 from the machine-learning model predictor 25, to re-convert the output to a Protobuf representation and to return the Protobuf-based call response to the gateway 7.

As mentioned above, the example of FIG. 4 offers a REST microservice to the one or more clients 8. Accordingly, the get module 20 of the controller 6 is arranged to receive the interrogation requests 10 by way of e.g. http get requests from the client 8, the prepare prediction module 21 is arranged to serialize the payload of the http get requests to a Protobuf representation, and the response module 23 is arranged to de-serialize the Protobuf representation of the call responses 14 to form http response messages and to return the interrogation responses 16 in form of the http response messages. In this way, the machine-learning model 4 hosted by the model server container 3 can be queried by standard webclients, while remaining to run on and in its native programming and training environment.

The example of FIG. 5 provides a streaming microservice to the one or more clients 8, as already mentioned above. Accordingly, the get module 30 of the controller 6 is arranged to receive the interrogation requests 10 by way of e.g. Kafka messages requesting predictions from machine-learning model 4, the prepare prediction module 31 is arranged to serialize the payload of the Kafka messages to a Protobuf representation, and the response module 33 is arranged to de-serialize the Protobuf representation of the call responses 14 to form Kafka response messages and to send the interrogation responses 16 in form of the Kafka response messages back to the client 8. In this way, the machine-learning model 4 hosted by the model server container 3 can be queried by standard streaming clients, while remaining to run on and in its native programming and training environment.

The examples of FIG. 4 and FIG. 5 may be generalized to any communication protocols, interfaces and service standards or de-facto standards as well as proprietary service interfaces which realize technical functionalities of the communication interface 9 to exchange interrogation requests 10 and interrogation responses 16 between a client 8 and the execution platform 1 and the service container 2, respectively, as well as to any execution-platform-internal interface 5 between the service container 2 and the model server container 3. Likewise, the execution platform 1 may be implemented on the basis of any suitable computerized platform based on a second programming language with the aforementioned characteristics, while the machine-learning model 4 is deployed within the model server container 3 on the basis of any first programming language with the aforementioned characteristics.

In embodiments, the execution platform 1 is deployed to provide a cloud service. That is, in any one of the aforementioned examples, the execution platform 1 may be located in a cloud, and the service interface offered by the service container 2 is a cloud service interface. For example, in these embodiments, the functionality provided by the machine-learning model 4 may be a Software as a Service (SaaS) or a Platform as a service (PaaS), allowing clients 8 to inquire the machine-learning model 4 as a cloud service or customers to deploy their own machine-learning model 4 in the cloud. The execution platform 1 may also be deployed as part of a Digital Integration Hub (DIH) architecture in which the service container 2 forms a front-end API service to clients 8 such as mobile stations, web clients, company networks, and others.

In embodiments, the execution platform 1 may also host more than one machine-learning model 4. For example, to this end, the execution platform 1 include multiple model server containers 3, each hosting a respective machine-learning model 4. In other variants, one model server container 4 may hosts multiple machine-learning models 4. The service container 2 is then arranged to receive interrogation requests 10 for any one of the machine-learning models hosted by the execution platform 1 and to return interrogation requests 16 with the corresponding outputs of the machine-learning models 4 to the requesting clients 8.

In some embodiments, the execution platform 1 may also include further containers beyond the service container 2 and one or more model server container 3. These further containers may serve additional purposes which are advantageously implemented based on the more performant second programming language as opposed to the first programming language. For example, a functionality of sanity or health checks to regularly verify that the machine-learning model hosted by the model server container 3 is properly operating may be added to the execution platform 1 by way of such additional containers. Such checks may be formed by an additional container generating artificial calls which are sent to the model server container 3 and the call responses thereto are evaluated by the additional container. In the same manner, performance tests of the machine-learning model 4 may be conducted for which the additional container monitors the response time of the machine-learning model 4. In some embodiments, the health check and/or performance test functionality may be included in the service container 2.

The aforementioned aspects may be embodied as functionalities of an execution platform 1, in particular in accordance with the examples of FIGS. 1, 3, 4 and 5. Moreover, the aforementioned aspects may be provided in form of method activities and characteristics of an execution platform 1 performing such method activities. Likewise, the aforementioned aspects may be embodiment as a computer program that performs such activities when executed on a computerized platform (cf. FIG. 6) with corresponding characteristics, as well as a non-transitory storage medium storing computer program instructions of such computer program.

Figure 6:
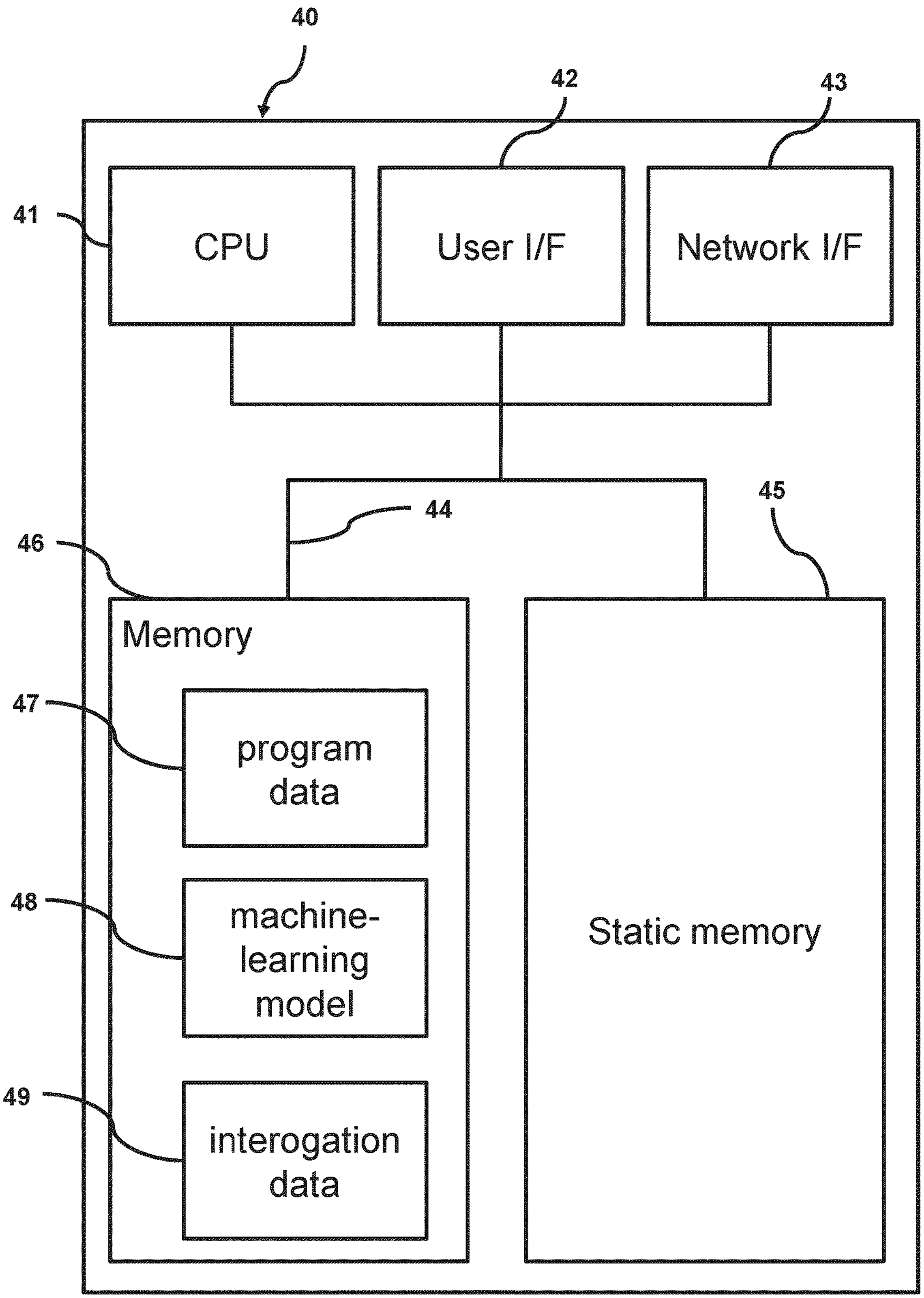
FIG. 6 depicts an internal structure of a computation engine which hosts an execution platform.

FIG. 6 is a diagrammatic representation of the internal component of a computing machine 40 implementing the functionality of the execution platform 1. Similar computing machines may also realize one or more of the clients 8 described above. The computing machine 40 includes a set of instructions to cause the computing machine 40 to perform any of the methodologies discussed herein when executed by the computing machine 40. The computing machine 40 includes at least one processor 41, a main memory 46 and a network interface device 43 which communicate with each other via a bus 44. Optionally, the computing machine 40 may further include a static memory 45 and a disk-drive unit. A video display, an alpha-numeric input device and a cursor control device may be provided as examples of user interface 42. The network interface device 43 connects the computing machine 40 implementing the execution platform 1 to the other components such as the clients 8.

Computing machine 40 includes a memory 46 such as main memory, random access memory (RAM) and/or any further volatile memory. The memory 46 may store temporary data and program data 47 to facilitate the functionality of the execution platform 1, including program data to realize the conversion and re-conversion functionalities and the calling functionalities as described above. Also the machine-learning model 4 may be represented in the memory 46 in form of machine-learning model data 48. The memory 46 may also store temporary data such as interrogation request and interrogation response data 49.

A set of computer-executable instructions embodying any one, or all, of the methodologies described herein, resides completely, or at least partially, in or on a machine-readable storage medium, e.g., in the static memory 45 or, when loaded and being executed, in the main memory 46. For example, the instructions may include software processes implementing the database request processing functionality of the execution platform 1. The instructions may further be transmitted or received as a propagated signal via the Internet through the network interface device 43 or via the user interface 42. Communication within computing machine 40 is performed via a bus 44. Basic operation of the computing machine 40 is controlled by an operating system which is also located in the memory 46, the at least one processor 41 and/or the static memory 45.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. An execution platform for executing a machine-learning model programmed and trained on a development platform utilizing a first programming language, the execution platform being implemented based on a second programming language, the execution platform comprising:

at least one processor;

a service container executed by the at least one processor and configured to receive interrogation requests to interrogate the machine-learning model and to return interrogation responses of the machine-learning model;

a model server container executed by the at least one processor and configured to host an encapsulated instance of the machine-learning model adapted to run on the execution platform utilizing data structures and operations of the first programming language; and an execution-platform-internal interface between the service container and the model server container, wherein the service container executed by the at least one processor is further configured to convert the interrogation requests to calls of the model server container and re-convert call responses from the model server container to the interrogation responses, wherein the model server container executed by the at least one processor is further configured to receive the calls via the execution-platform-internal interface, to determine outputs of the machine-learning model, and to return the call responses with the output via the execution-platform-internal interface, wherein the service container executed by the at least one processor is configured to provide a microservice to one or more clients from which the interrogation requests are received, and wherein the service container executed by the at least one processor comprises an application programming interface controller configured to receive and convert the interrogation requests and to re-convert the call responses, the service container executed by the at least one processor is configured to implement the microservice that is provided to the one or more clients, and the service container executed by the at least one processor comprises a gateway configured to call the model server container and receive the call responses via the execution-platform-internal interface.

2. The execution platform of claim 1 wherein the service container, the model server container, or both are implemented as a pod of a containerization software platform.

3. The execution platform of claim 1 wherein the interrogation requests are at least one of Representational State Transfer, protocol messages, and streaming process messages.

4. The execution platform of claim 1 wherein converting the interrogation requests comprises a serialization, and re-converting the call responses comprises a de-serialization.

5. The execution platform of claim 1 wherein the first programming language is adapted for machine-learning development and training purposes, and the second programming language is an object-oriented language arranged to provide standardized service interfaces.

6. The execution platform of claim 1 wherein the gateway is configured to call the model server container via the execution-platform-internal interface based on a remote procedure call framework and the calls to the model server container are remote procedure calls.

7. The execution platform of claim 6 further comprising:

a communication interface configured to bidirectionally couple the service container to the one or more clients for receiving the interrogation requests and returning the interrogation responses.

8. The execution platform of claim 1 wherein the execution platform is deployed to provide a cloud service.

9. A method for executing a machine-learning model programmed and trained on a development platform utilizing a first programming language on an execution platform being implemented based on a second programming language, the method comprising:

at a computing device comprising at least one processor configured to execute a service container and a model server container:

receiving, at the service container, interrogation requests to interrogate the machine-learning model;

converting, at the service container, the interrogation requests to calls of the model server container hosting an encapsulated instance of the machine-learning model adapted to run on the execution platform utilizing data structures and operations of the first programming language;

calling, by the service container, the model server container via an execution-platform-internal interface between the service container and the model server container;

receiving, at the model server container, the calls via execution-platform-internal interface;

determining, by the model server container, outputs of the machine-learning model;

returning, by the model server container, call responses with the output via the execution-platform-internal interface;

re-converting, by the service container, the call responses from the model server container to interrogation responses; and returning, by the service container, the interrogation responses, wherein the service container is configured to provide a microservice to one or more clients from which the interrogation requests are received, and wherein the service container comprises an application programming interface controller configured to receive and convert the interrogation requests and to re-convert the call responses, the service container is configured to implement the microservice that is provided to the one or more clients, and the service container comprises a gateway configured to call the model server container and receive the call responses via the execution-platform-internal interface.

10. The method of claim 9 wherein the service container, the model server container, or both are implemented as a pod of a containerization software platform.

11. The method of claim 9 wherein the interrogation requests are at least one of Representational State Transfer, protocol messages, and streaming process messages.

12. The method of claim 9 wherein converting the interrogation requests comprises a serialization, and re-converting the call responses comprises a de-serialization.

13. The method of claim 9 wherein the first programming language is adapted for machine-learning development and training purposes, and the second programming language is an object-oriented language arranged to provide standardized service interfaces.

14. The method of claim 9 wherein the gateway is configured to call the model server container employs via the execution-platform-internal interface based on a remote procedure call server framework and the calls to the model server container are remote procedure calls.

15. The method of claim 14 further comprising:

a communication interface configured to bidirectionally couple the service container to the one or more clients for receiving the interrogation requests and returning the interrogation responses.

16. The method of claim 9 wherein the method is deployed to provide a cloud service.

17. A non-transitory computer storage medium encoded with a computer program, the computer program comprising a plurality of program instructions that when executed by at least one processor cause the at least one processor to perform operations for executing a machine-learning model programmed and trained on a development platform utilizing a first programming language on an execution platform being implemented based on a second programming language, and the operations comprising:

receive, at a service container, interrogation requests to interrogate the machine-learning model and to return interrogation responses of the machine-learning model;

host, at a model server container, an encapsulated instance of the machine-learning model adapted to run on the execution platform utilizing data structures and operations of the first programming language;

convert, at the service container, the interrogation requests to calls of the model server container;

re-convert, at the service container, call responses from the model server container to the interrogation responses;

receive, at the model container, the calls at the model server container via an execution-platform-internal interface between the service container and the model server container;

determine, at the model server container, outputs of the machine-learning model; and return the call responses with the output via the execution-platform-internal interface, wherein the service container is configured to provide a microservice to one or more clients from which the interrogation requests are received, and wherein the service container comprises an application programming interface controller configured to receive and convert the interrogation requests and to re-convert the call responses, the service container is configured to implement the microservice that is provided to the one or more clients, and the service container comprises a gateway configured to call the model server container and receive the call responses via the execution-platform-internal interface.

* * * * *